April 23, 1968  R. W. WEINBERG  3,379,214
PERMANENT MAGNET VALVE ASSEMBLY
Filed Jan. 15, 1965  2 Sheets-Sheet 1
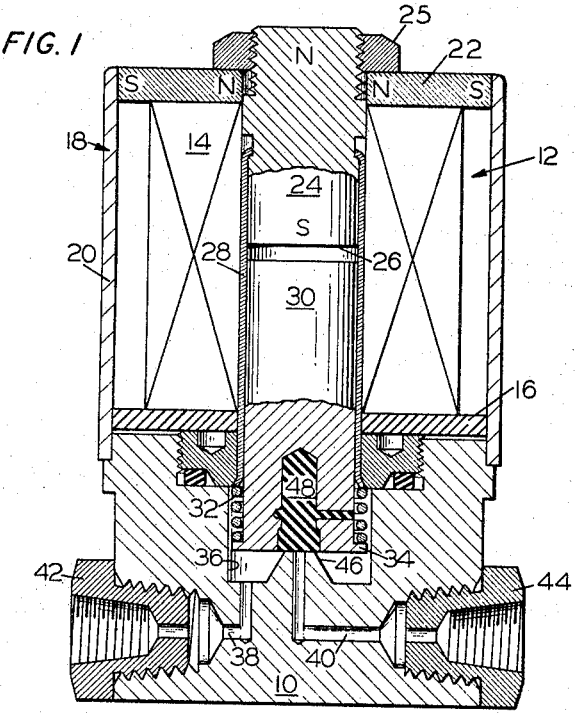
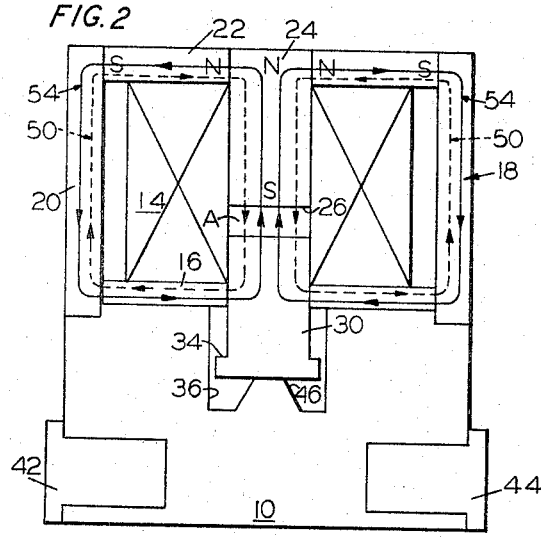
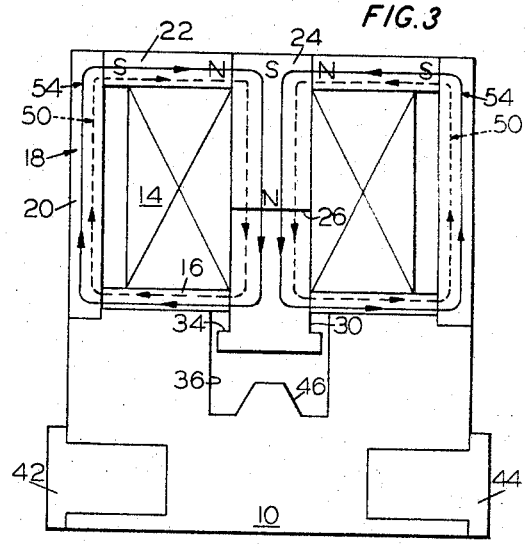
INVENTOR.
ROBERT W. WEINBERG
BY *Lindsey, Prutzman and Hayes*
ATTORNEYS April 23, 1968  R. W. WEINBERG  3,379,214
PERMANENT MAGNET VALVE ASSEMBLY
Filed Jan. 15, 1965  2 Sheets-Sheet 2
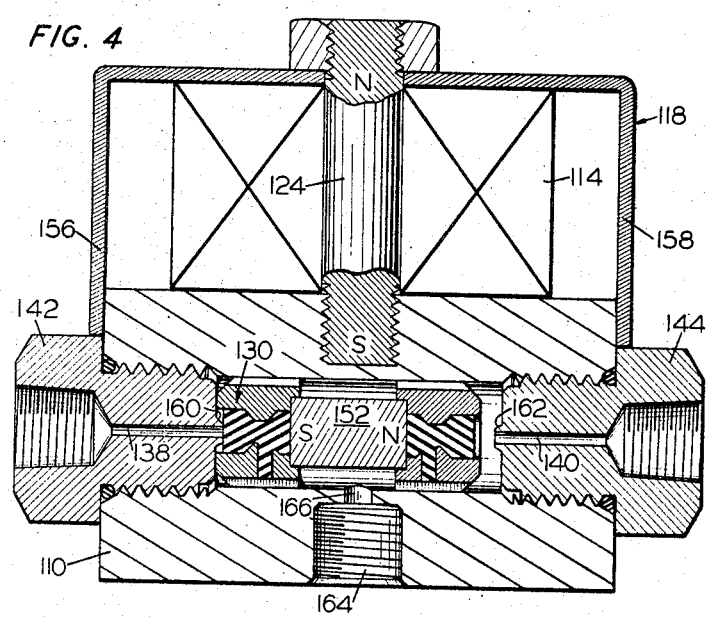
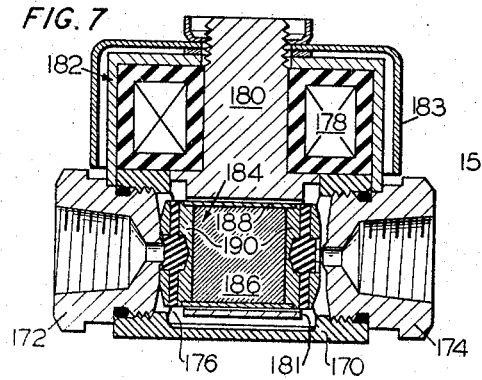
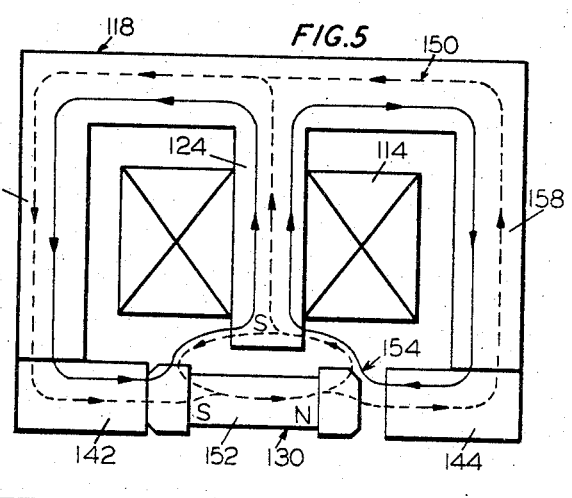
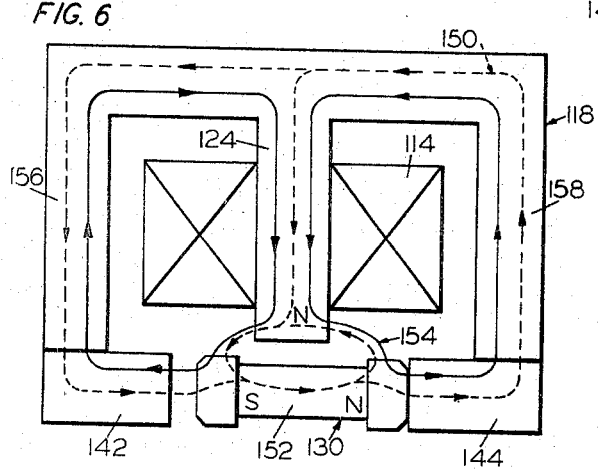
INVENTOR.
ROBERT W. WEINBERG
BY Lindsey, Prutzman and Hayes
ATTORNEYS United States Patent Office 3,379,214
Patented Apr. 23, 1968

3,379,214
PERMANENT MAGNET VALVE ASSEMBLY
Robert W. Weinberg, West Hartford, Conn., assignor to Skinner Precision Industries, Inc., New Britain, Conn., a corporation of Connecticut
Filed Jan. 15, 1965, Ser. No. 425,735
1 Claim. (Cl. 137—625.5)

ABSTRACT OF THE DISCLOSURE

A valve assembly including a body having an inlet and an outlet and a flow passageway including a valve chamber therebetween, a single electromagnet supported on the body, a valve member in the valve chamber movable between first and second flow control positions for controlling fluid flow, and magnetic circuit means including a permanent magnet providing a permanent magnetic flux, and a reversible polarizable semipermanent magnet providing a residual flux in the same direction as the electromagnet flux of sufficient magnitude and duration for latching the valve member, upon de-energization of the electromagnet, while effectively resisting a reversal in direction of the residual flux due to the influence of the permanent magnet.

---

This invention generally relates to devices for the control of fluid flow and is more specifically directed to a valve assembly of the general type disclosed in the co-pending application of William C. Bremner and Robert W. Weinberg, entitled, "Valve," Ser. No. 314,898 filed Oct. 9, 1963, now U.S. Patent No. 3,203,447 granted Aug. 31, 1965.

A principal object of the present invention is the provision of an improved valve assembly having an electromagnetically actuated valve member which is exceptionally stable in either an open or closed flow control position and which is provided with a memory whereby the valve member is automatically retained in the last position to which it was moved after the energizing power is shut off to thereby provide a bistable valve assembly of unusual utility useful for a variety of different fluid control operations.

Another object of the present invention is the provision of a valve assembly of the type described having a rugged construction which is economically manufactured and assembled for repeated use over extended periods of time.

A further object of the present invention is the provision of an improved electromagnetically actuated valve operator particularly suited to be incorporated in fluid control systems having requirements for attaining the stated objects and additionally requiring compact control devices providing reliable operation in regulating fluid flow.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

In the drawings:

FIG. 1 is a cross-sectional view of one embodiment of a valve assembly constructed in accordance with the present invention;

FIG. 2 is a diagrammatic view of the valve assembly of FIG. 1 illustrating the magnetic flux paths employed when the valve member is in one fluid control position;

FIG. 3 is a view similar to FIG. 2 but showing the magnetic flux paths employed when the valve member is held in an opposite fluid control position;

FIG. 4 is a cross-sectional view of another embodiment of a valve assembly of the present invention;

FIG. 5 is a diagrammatic view of the valve assembly of FIG. 4 illustrating the magnetic flux paths employed when the valve member is held in one fluid control position;

FIG. 6 is a view similar to FIG. 5 but showing the magnetic fluid paths employed when the valve member is held in an opposite fluid control position; and FIG. 7 is a cross-sectional view of a valve assembly representing another embodiment of the present invention.

Referring first to that form of the invention illustrated in FIGS. 1–3, inclusive, a valve assembly is shown which includes a valve body 10 upon which is supported a valve operator, generally designated by the numeral 12.

The valve operator 12 includes an electromagnet with a coil 14, desirably insulated in any known manner, positioned on a plate 16 formed of a suitable soft magnetic material and having a central aperture in coaxial alignment with the throughbore formed in coil 14. Coil 14 and plate 16 are enclosed within a coil housing cover, generally designated 18, which is illustrated as having a side wall provided by an open ended cylinder 20 of soft magnetic material in contact with the outer edge of plate 16 adjacent one end of the cylinder which is connected to body 10. The opposite end of the cylinder 20 engages the outer periphery of a centrally apertured cap or ring 22 overlying the top of coil 14, the inner periphery of cap 22 being in contact with a stud forming a center post 24 for the housing 18. A nut 25 is threadedly engaged at an outer or upper end of the center post 24, the center post having its inner or lower end 26 received within the throughbore of coil 14 at an intermediate point therein thereby to facilitate the positioning of the coil within the housing. A core member for the electromagnet is thus provided which includes the housing 18 and its center post 24.

Also provided in the valve operator is a sleeve 28 of nonmagnetic material, such as stainless steel, frictionally locked in a notch, formed around an intermediate portion of center post 24, and extended axially downwardly from the lower end 26 of the center post. Received within sleeve 28 is a valve member or plunger 30 for the electromagnet, the plunger illustrated as being of generally cylindrical shape for slidable movement longitudinally of sleeve 28. For biasing plunger 30 downwardly away from center post 24, a spring 32 is retained between the bottom of sleeve 28 and a circular flange 34 provided at the lower end of plunger 30.

The valve body 10 includes a recess 36 of generally cylindrical cross section formed in coaxial alignment with plunger 30 for receiving its lower or flanged end. The bottom of recess 36 is shown as being connected to an inlet passage 38 and to an outlet passage 40 drilled in body 10 and extending respectively to inlet and outlet ports 42 and 44 illustrated in the form of screw plugs fixed on opposite sides of body 10. Extending upwardly from the bottom of recess 36 is an annular valve seat 46 which is apertured for communication with outlet passage 40, valve seat 46 being positioned opposite an insert 48 of rubberlike material desirably inset in the flanged end of plunger 30 to provide an effective seal.

Sleeve 28 and recess 36 thus form a valve chamber for plunger 30 which is reciprocated, as more fully described hereafter, between an upper and lower stop at opposite ends of the chamber as provided, respectively, by the lower end 26 of center post 24 and the valve seat 46 to control fluid flow between the inlet and outlet ports 42 and 44. In one position of plunger 30, illustrated in FIGS. 1 and 2 as being a first fluid control position at the bottom of the chamber, communication between passages 38 and 40 is closed in contrast to a second fluid control position of the plunger at the opposite, upper end of the chamber, illustrated in FIG. 3, establishing communication between the inlet and outlet ports 42 and 44 by means of a fluid passageway collectively defined by the chamber and by passages 38 and 40.

The described structure provides a magnetic circuit utilized in actuating the plunger 30 and retaining it in a selected fluid control position. Referring to FIGS. 2 and 3 in conjunction with the valve assembly of FIG. 1, a first magnetic flux path 50, represented by the dotted lines, includes the center post 24 and plunger 30 whereby an attractive magnetic force is provided therebetween by the flux of a permanent magnet suitably positioned in flux path 50. In the preferred embodiment, the cap 22 of the coil housing cover is formed of a suitable material exhibiting permanent magnetic characteristics, such as the "ceramic" magnetic material $BaO \cdot 6Fe_2O_3$ or the like, to provide a permanent ring magnet in the valve operator. As illustrated, the permanent magnetic flux extends in the direction of the arrows along path 50 from the inner periphery or north pole of the ring magnet down center post 24 to the plunger 30, the flux returning to the outer periphery or south pole of the ring magnet through the plate 16 and the side wall of the housing 18 to form a toroidal or doughnut-shaped flux path.

In order to provide the valve assembly with a memory for securely latching plunger 30 in the last fluid control position to which it was magnetically directed, a second magnetic flux path 54 of toroidal configuration, generally similar to that of the permanent magnetic flux path 50, is provided with a portion including the center post 24 and plunger 30, and a semipermanent magnet or block of magnetizable material capable of assuming two opposite conditions of remanent magnetization is incorporated in the valve assembly so as to be positioned in a suitable location in flux path 54. In the preferred embodiment, center post 24 is illustrated as being formed of this magnetically hard material such as cobalt steel, Alnico I–V and the like.

It is believed that the operation of the valve assembly will be apparent from the foregoing description together with the following brief explanation. Coil 14 is initially connected to a suitable source of electrical power, not shown, so as to be selectively energizable in opposite polarities. To shift plunger 30 from the fluid control position at the upper end of the chamber to its opposite position at the bottom thereof, a pulse of proper polarity is applied to the coil inducing a flux along path 54 as shown in FIG. 2. This induced flux opposes the flux of the permanent magnet in the air gap A between the lower end 26 of the center post 24 and plunger 30 resulting in the latter being moved into sealing engagement with valve seat 46 under the influence of spring 32 to close off the fluid passageway. Likewise, if it is desired to return the plunger to the opposite fluid control position thereby to open the fluid passageway, the electromagnet is energized with an opposite polarity inducing a flux, the direction of which is illustrated in FIG. 3, which reinforces the permanent magnetic flux to provide an attractive magnetic force between the center post 24 and plunger 30 minimizing the air gap therebetween so as to overcome the bias of spring 32 and to pick up the plunger 30.

By alternately applying an energizing pulse to coil 14 as described, a magnetic flux of first one and then the opposite polarity is induced to shift the plunger up and down for momentary contact, if desired, with opposite stops in the valve chamber. If it is desired to retain the valve assembly in either an open or closed condition for an extended period of time, the plunger 30 is moved to the chosen position and the electromagnet is de-energized, whereupon the semipermanent magnet such as in center post 24 produces a residual flux and magnetic force of sufficient magnitude and duration in the same direction as the last coil flux thereby to assure that the plunger is latched in the last position to which it was moved as determined by the electromagnet.

It will be apparent that even if an unusual surge of pressurized fluid, vibrations and the like, were to jar the valve member over center adjacent the stop opposite that position to which it was last moved, the resultant magnetic flux insures proper return of the valve member to provide a valve assembly of exceptional reliability.

In the embodiment of the invention illustrated in FIGS. 4–6, inclusive, the same numerals with the prefix one have been utilized to identify like parts. In general, the valve assembly is similar to that described in the previous embodiment and is similarly assembled. However, in this second embodiment it will be noted that the plunger designated 130 is loosely received in valve body 110 in a horizontal valve chamber axially aligned with the screw plugs 142 and 144 on opposite sides of the body. Plunger 130 is desirably slotted lengthwise so that the fluid may more easily flow along the plunger between it and the walls of the valve chamber. Plugs 142 and 144 have inner faces including valve seats 160 and 162 which surround passages 138 and 140, formed in the plugs, and additionally act as stops for plunger 130 on opposite ends of the chamber. Plugs 142, 144 are respectively in contact with legs 156, 158 provided by a housing or yoke 118 and, like the yoke, each plug is formed of a suitable soft magnetic material. Inside yoke 118 is the coil 114 removably secured in position within a core of generally E-shaped cross section provided by the connected outer legs 156, 158 of the yoke and a stud of semipermanent magnetic material forming the center leg or center post 124, the latter being shown as being screwed into body 110 to a point adjacent the chamber midway between plunger seats 160, 162.

A further modification of the second embodiment of the invention is that the permanent magnet 152 is formed as a center piece of the plunger 130 and is normally attracted with equal force to each plug 142, 144, the permanent magnet 152 having north and south poles, respectively on the right and left sides of the plunger as viewed in FIG. 4 whereby the direction of the permanent magnetic flux is from left to right as indicated by the arrows in FIGS. 5 and 6. The permanent magnetic flux path 150 is thereby provided with a portion extending through the plunger to include both plugs 142, 144.

This embodiment of the valve assembly is illustrated as being a three-way valve having a third port 164 on the bottom of the valve body 110 in communication with a passage 166 extending into a central portion of the plunger bore. Thus, when the plunger is positioned as viewed in FIG. 4, communication between passages 140 and 166 is established while the passage 138 is closed. On the other hand, when the plunger 130 is in its opposite position, communication between passages 138 and 166 is established and passage 140 is closed.

As in the previous form of the invention, plunger 130 is reciprocated by current reversal in coil 114 as more fully explained in the above-identified application. Also, the second magnetic flux path 154 is representative of that of the induced flux during coil energization as well as that of the residual flux of the magnetizable center post 124, flux path 154 extending between the center post and each plug 142 and 144 individually. In this manner the residual and permanent magnetic fluxes interact as denoted by the arrows in FIGS. 5 and 6 to securely latch plunger 130 by a resultant magnetic pull at either the left or right end of the chamber depending on the polarity of the last energization of coil 114.

Referring now to FIG. 7 wherein the invention is embodied in a commercial valve assembly generally similar to the device shown in FIG. 4, a cylindrical valve body 170 is illustrated as having diametrically opposed screw plugs 172 and 174 opening into a fluid passageway 176 therebetween. It will be understood that an additional common port, not shown, is provided in the body in communication with the passageway.

The electromagnet supported on the body includes coil 178 and a core having a center leg or post 180 and a connected yoke 182 providing the outer legs which are retained in position against body 170 by threadedly engaged plugs 172, 174, the electromagnet being covered by an enclosure cap 183 suitably secured to the body. As in the previous embodiment, a semipermanent magnet is in center post 180, and yoke 182 and the plugs are formed of soft magnetic material.

In order to provide a magnetic flux path of low reluctance, the lower end of center post 180 includes an enlarged portion 181 received in passageway 176 and having a throughbore axially aligned with plugs 172, 174 for accommodating plunger 184, the latter having a permanent magnetic center piece 186 desirably protected from flow media by a jacket 188 of suitable material such as stainless steel. The described structure reduces the gap between the center post and plunger pole pieces 190, and the center post magnetic flux is distributed around the circumference of the plunger 184 so as to cross the gap in a direction substantially parallel to the plunger axis thereby providing a net magnetic force of increased efficiency for shifting and holding the plunger in a selected fluid control position.

Finally, the valve assembly of the present invention has a compact structure which is not only inexpensive to manufacture and assemble, while reducing the need for large and costly permanent magnets, but also is economical to operate under low power requirements. Moreover, it is adapted for remote control operation in various types of fluid control systems having need for a variety of porting arrangements and dependable high speed positioning of the valve member for continued valving action in a selected direction. No further mechanical action is required to securely latch the valve member in a fluid control position after de-energization of the electromagnet.

As will be apparent to persons skilled in the art, various modifications and adaptations of the structure above described will become readily apparent without departure from the spirit and scope of the invention, the scope of which is defined in the appended claim.

I claim:

1. A fluid control valve assembly comprising a body having an inlet and an outlet and a flow possageway including a valve chamber therebetween, the body having portions formed of magnetic material adjacent opposite ends of the chamber, an electromagnet supported on the body and having a coil and an E-shaped core including a pair of outer legs and a center leg therebetween, the coil disposed within the core around the center leg, the outer legs of the core being connected to opposite sides of the body adjacent the portions of magnetic material, the center leg having an inner end extending into the body and received in the valve chamber between the opposite ends thereof, the inner end of the center leg having a throughbore axially aligned with the opposite ends of the chamber, a plunger having a permanent magnet therein received in the throughbore of the center post for movement between a first fluid control position and a second fluid control position at opposite ends of the chamber, the permanent magnet providing a flux attracting the plunger into either position against the body portions, and a semipermanent magnet in the center leg and providing, upon de-energization of the electromagnet, a flux in the same direction as the electromagnetic flux thereby to magnetically latch the valve plunger in one fluid control position as determined by the electromagnet.

References Cited

UNITED STATES PATENTS

| | | | |
|---|---|---|---|
| 3,013,768 | 12/1961 | LaMastra | 251—139 X |
| 3,040,217 | 6/1962 | Conrad | 335—234 |
| 3,082,359 | 3/1963 | Mangiafico et al. | 251—141 X |
| 3,202,886 | 8/1965 | Kramer | 335—234 |
| 3,203,447 | 8/1965 | Bremner et al. | 137—595 X |

M. CARY NELSON, *Primary Examiner.*

A. ROSENTHAL, *Examiner.*

W. J. JOHNSON, *Assistant Examiner.*